United States Patent [19]
Harand et al.

[11] 4,236,970
[45] Dec. 2, 1980

[54] STRUCTURAL UNIT FORMED OF A COOLANT PUMP AND A STEAM GENERATOR, ESPECIALLY FOR NUCLEAR REACTOR PLANTS SECURED AGAINST RUPTURE

[75] Inventors: Elmar Harand, Höchstadt; Eberhard Michel, Nüremberg, both of Fed. Rep. of Germany

[73] Assignee: Kraftwerk Union Aktiengesellschaft, Mulheim an der Ruhr, Fed. Rep. of Germany

[21] Appl. No.: 877,741

[22] Filed: Feb. 14, 1978

[30] Foreign Application Priority Data

Feb. 14, 1977 [DE] Fed. Rep. of Germany ....... 2706164

[51] Int. Cl.² .............................................. G21C 13/02
[52] U.S. Cl. ...................................... 176/87; 176/65; 165/158
[58] Field of Search .............. 176/65, 87; 415/219 R, 415/219 C; 122/32; 165/158

[56] References Cited

U.S. PATENT DOCUMENTS

| | | | |
|---|---|---|---|
| 3,470,066 | 9/1969 | Livsey et al. | 176/87 X |
| 3,749,512 | 7/1973 | Miller et al. | 415/219 R X |
| 3,802,498 | 4/1974 | Romanos | 122/32 X |
| 3,850,796 | 11/1974 | Thome | 176/87 X |
| 3,859,008 | 1/1975 | Wieser | 415/219 C X |
| 3,910,714 | 10/1975 | Allen et al. | 415/219 C X |
| 3,916,990 | 11/1975 | Ruhe et al. | 122/32 X |
| 4,038,134 | 7/1977 | Dorner et al. | 176/87 X |
| 4,039,377 | 8/1977 | Andrieu et al. | 122/32 X |
| 4,084,546 | 4/1978 | Schneeberger et al. | 122/32 |
| 4,094,737 | 6/1978 | Greischel et al. | 176/65 |

FOREIGN PATENT DOCUMENTS

| | | |
|---|---|---|
| 156054 | 8/1974 | Fed. Rep. of Germany . |
| 2244564 | 10/1975 | Fed. Rep. of Germany . |
| 2261477 | 11/1975 | Fed. Rep. of Germany . |
| 991912 | 5/1965 | United Kingdom . |

*Primary Examiner*—Peter A. Nelson
*Attorney, Agent, or Firm*—Herbert L. Lerner

[57] ABSTRACT

A coolant pump and a steam generator are formed together into a structural unit, the steam generator being a straight-tube steam generator having a central ascending pipe, a tube bundle having a central passageway through which the ascending pipe extends, an upper primary-side inlet, chamber communicating with the tube bundle at an upper end thereof, a lower primary chamber communicating with the tube bundle at a lower end thereof, the central ascending pipe communicating with the inlet chamber for feeding primary medium thereto from which the primary medium flows back through the tube bundle to the lower primary chamber, the ascending pipe having an axial elongation, the coolant pump having an impeller and a guidance device surrounding the impeller, the ascending pipe-elongation having a construction corresponding to that of the guidance device, partition means for dividing the lower primary chamber into a suction space and an outlet chamber space, the pump having a suction side connected through the suction space of the lower primary chamber to a hot line string of a double line connected to the steam generator, the outlet chamber space of the lower primary chamber being connected to a cold line string of the double line.

13 Claims, 6 Drawing Figures

STRUCTURAL UNIT FORMED OF A COOLANT PUMP AND A STEAM GENERATOR, ESPECIALLY FOR NUCLEAR REACTOR PLANTS SECURED AGAINST RUPTURE

The invention relates to a structural unit formed of a coolant pump and a steam generator, preferably for a nuclear reactor plant or installation secured against rupture and having a pressurized water reactor, a steam generator, a main coolant pump and connecting lines in a primary circulatory loop, the main coolant pump being installed in a primary chamber of the steam generator and the structural unit formed thereby having an upright operating position, and a string of hot and cold lines of the primary circulatory loop extending between the reactor pressure vessel and the primary side of the steam generator are structurally united into a double line connectible to the structural unit formed by the pump and the steam generator.

Such a nuclear reactor plant has become known heretofore from German Patent DT-PS No. 2 244 562 and German Patent-of-Addition DT-PS No. 2 261 477 associated therewith. In this regard, a preferred embodiment is provided therein which has, in a multiple circulatory loop arrangement, several of the integrated structural units formed of steam generator and main coolant pump grouped around the reactor pressure vessel in an upright disposition while attaining primary circulatory loop lines that are as short, straight and largely horizontal as possible. This, in turn, results in the attainment of a relatively small base area for the plant and symmetrical, defined thermal expansion relationships with observable line guidance, providing an embodiment which is especially suited for being sheathed in a casing ensuring against rupture because the components are generally formed as cylindrical members. For reasons of safety, all of the hereinaforementioned components and lines of the primary circulatory loop are accordingly expediently enclosed, respectively, by jackets or shells ensuring against rupture so that any crack or break in a component or in a line, where also it should aways occur, is limited in the cross section thereof from the very start. In the heretofore known nuclear reactor plants, steam generators of the U-tube type are employed for the integrated structural units. A flow-promoting construction is thus produced for the primary chamber with the main coolant pump inserted therein. It is desired, however, that also straight-tube steam generators be installed into nuclear reactor installations that are secured against rupture because such straight-tube steam generators have a smaller base area in comparison to that of U-tube steam generators, and are also able to attain flow and efficiency advantages for a straight-tube steam generator with forced throughput or flow-through independently of the construction data of the nuclear reactor plant.

A straight-tube steam generator integrated with a main coolant pump of a pressurized water-nuclear reactor plant has in itself become known (U.S. Pat. No. 3,395,076). In this regard, however, the steam generator is provided with the pump in horizontal position, which increases the base area of the primary circulatory loop nuclear reactor installation, the steam generator and built-in coolant pumps are not disposed on rays extending from the central axis of the reactor pressure vessel, which requires, thermally-expansively, less observable relationships and, also, no thought is given therein to providing security against rupture for the primary circulatory loop.

It is accordingly an object of the invention to provide a nuclear reactor plant with pressurized water secured against rupture into which a straight tube-steam generator is introduced in a manner that when the main coolant pump is installed in the primary chamber of the steam generator, an advantageous construction is produced with respect to the volume of the construction, base area thereof, flow relationships and accessibility to the primary chamber.

With the foregoing and other objects in view, there is provided, in accordance with the invention, in combination, a coolant pump and a steam generator formed together into a structural unit, the steam generator being a straight-tube steam generator having a central ascending pipe, a tube bundle having a central passageway through which the ascending pipe extends, an upper primary-side inlet chamber communicating with the tube bundle at an upper end thereof, a lower primary chamber communicating with the tube bundle at a lower end thereof, the central ascending pipe communicating with the inlet chamber for feeding primary medium thereto from which the primary medium flows back through the tube bundle to the lower primary chamber, the ascending pipe having an axial elongation, the coolant pump having an impeller and a guidance device surrounding the impeller, the ascending pipe-elongation having a construction corresponding to that of the guidance device, partition means for driving the lower primary chamber into a suction space and an outlet chamber space, the pump having a suction side connected through the suction space of the lower primary chamber to a hot line string of a double line connected to the steam generator, the outlet chamber space of the lower primary chamber being connected to a cold line string of the double line.

In accordance with another feature of the invention, the lower primary chamber has a base, and the axial elongation of the ascending pipe has a lower end disposed with a clearance space from the base of the lower primary chamber, the pump extending from below through a pass-through opening formed in the base of the lower primary chamber and into the ascending-pipe elongation.

In accordance with a further feature of the invention, the double line is constructed as a two-chamber pipe having a substantially horizontal partition therein subdividing it into a hot and cold line string.

In accordance with an added feature of the invention, the axial elongation of the ascending pipe passes substantially centrally through the partition of the lower primary chamber, and including means for connecting the ascending pipe-extension and the partition of the double line to an inner periphery of the lower primary chamber.

In accordance with an additional feature of the invention, the hot line string extends through the upper half of the double line, and the cold line string extends through the lower half thereof, and including a first arcuate diverting plate member closing off the hot line string from the outlet chamber space located above the partition of the lower primary chamber, the hot line string communicating with the suction space through a first opening formed in the partition of the lower primary chamber and laterally offset from the path of flow in the double line, the first opening being covered by the first diverting plate member, a second arcuate diverting plate member closing off the cold line string from the suction space located below the partition of the lower primary chamber, the cold line string communicating with the outlet chamber space through a second opening formed in the partition of the lower primary chamber and laterally offset from the path of flow in the double line, the second opening being covered by the second diverting plate member and being located opposite the first opening.

In accordance with yet another feature of the invention, the lower primary chamber has a base, and the axial elongation of the ascending pipe has a lower end disposed with a clearance space from the base of the lower primary chamber, the pump extending from below through a pass-through opening formed in the base of the lower primary chamber and into the ascending-pipe elongation, the double line being constructed as a two-chamber pipe having a substantially horizontal partition therein subdividing it into a hot and a cold line string, the partition means of the lower primary chamber comprising a substantially cylindrical wall, the axial elongation of the ascending pipe being surrounded with radial clearance by the substantially cylindrical wall and defining therewith the suction space in an annular shape closed from the outlet chamber space, an elongation member in the form of a feed pipe connecting the hot line string of the double line to an upper region of the annular suction space.

In accordance with an alternate feature of the invention, the lower primary chamber has a base, and the axial elongation of the ascending pipe has a lower end disposed with a clearance space from the base of the lower primary chamber, the pump extending from below through a pass-through opening formed in the base of the lower primary chamber and into the ascending-pipe elongation, the double line being constructed as a two-chamber pipe having a substantially horizontal partition therein subdividing it into a hot and cold line string, the pump having a pump housing shaft formed with a cylindrical and a tapered shaft section, and the lower end of the axial ascending-pipe elongation having an inner diameter corresponding to the outer diameter of the cylindrical shaft section and forms a tight seat thereon, the tapered shaft section being located between the tight seat, on the one hand, and the impeller and the guidance device, on the other hand, and with the inner surface of the axial ascending-pipe elongation, defining the suction space, and including an elongation member in the form of a feed pipe connecting the hot line string of the double line to said suction space.

In accordance with yet a further feature of the invention, the upper primary-side inlet chamber has a cover, the axial elongation of the ascending pipe being located at the upper end thereof and being disposed with a clearance space from the cover, the pump extending from above through a pass-through opening formed in the cover and into the ascending-pipe elongation, the upper primary-side inlet chamber constituting a pump pressure chamber, and the ascending tube upstream of the pump constituting a pump suction chamber.

In accordance with yet an added feature of the invention, the pump housing shaft has upwardly flaring curved boundary surfaces and the ascending pipe has correspondingly rounded-off upper edges, the boundary surfaces, on the one hand, and the rounded-off upper edges, on the other hand, defining therebetween a diverting annular channel for diverting a primary medium flow flowing upwardly through the ascending pipe into a downward direction toward an upper tube support plate at the bottom of the upper primary-side inlet chamber.

In accordance with yet an additional feature of the invention, the partition means of the lower primary chamber comprise a substantially horizontal partition, the lower end of the ascending pipe being retained in a pass-through bore formed in the substantially horizontal partition, the outlet chamber space being located above and the suction space being located below the partition in the lower primary chamber, the ascending tube communicating with the suction space, the hot line string extending along a lower half of the double line and into the suction space, and the cold line string extending along an upper half of the double line and being connected to the outlet chamber space.

In accordance with another feature of the invention the coolant pump is an axial-flow pump.

In accordance with an alternate feature of the invention, the coolant pump is a semi-axial flow pump.

In accordance with a concomitant feature of the invention, the structural unit is in assembly in a nuclear reactor installation having a pressurized water reactor and connecting lines connecting the pressurized water reactor, the coolant pump and steam generator into a primary circulatory loop, the coolant pump being installed in a primary chamber of the steam generator, the string of hot and cold lines being provided in the primary circulatory loop between a pressure vessel enclosing the reactor and the primary side of the steam generator.

The advantages derivable from the invention are primarily that the advantageous double line, preferably constructed as a two-chamber pipe, can be retained for connecting the steam generator-pump structural unit and provides a simple connection of the central ascending pipe of the steam generator to the hot line string of the double line. Furthermore, the basic construction of nuclear reactor or installations that are secured against bursting or rupture, which employ a steam generator of the U-tube type, can be retained, which is advantageous with regard to standardization of nuclear power plants that are secured from or protected against rupture.

Figure 1:
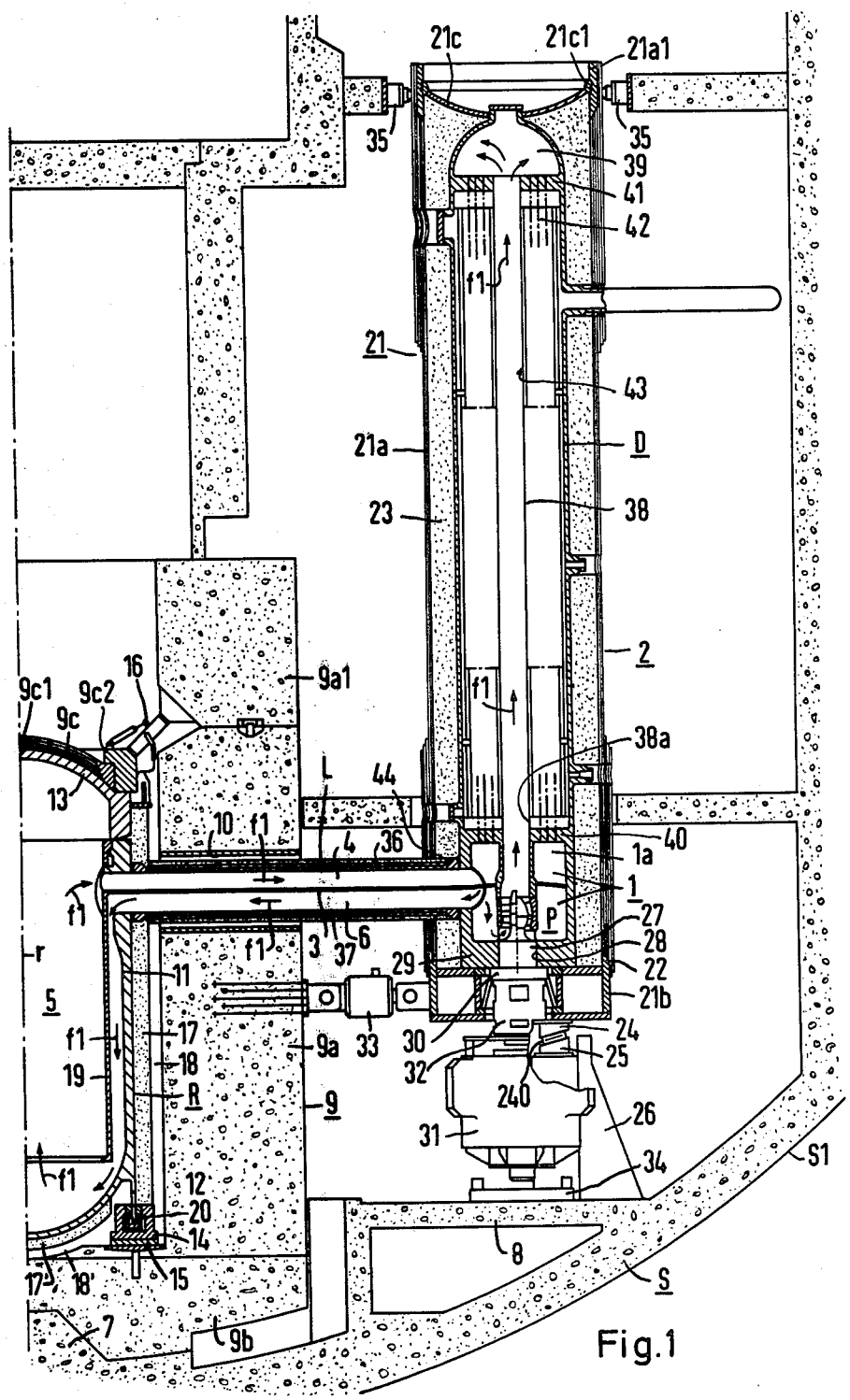
FIG. 1 is a diagrammatic fragmentary front elevational view, partly in section, of a structural unit according to the invention, installed in a nuclear reactor plant which is secured against rupture, and in which the pump which is built into the lower primary chamber of the steam generator is disposed in a into a cold line string (first embodiment)
Figure 1A:
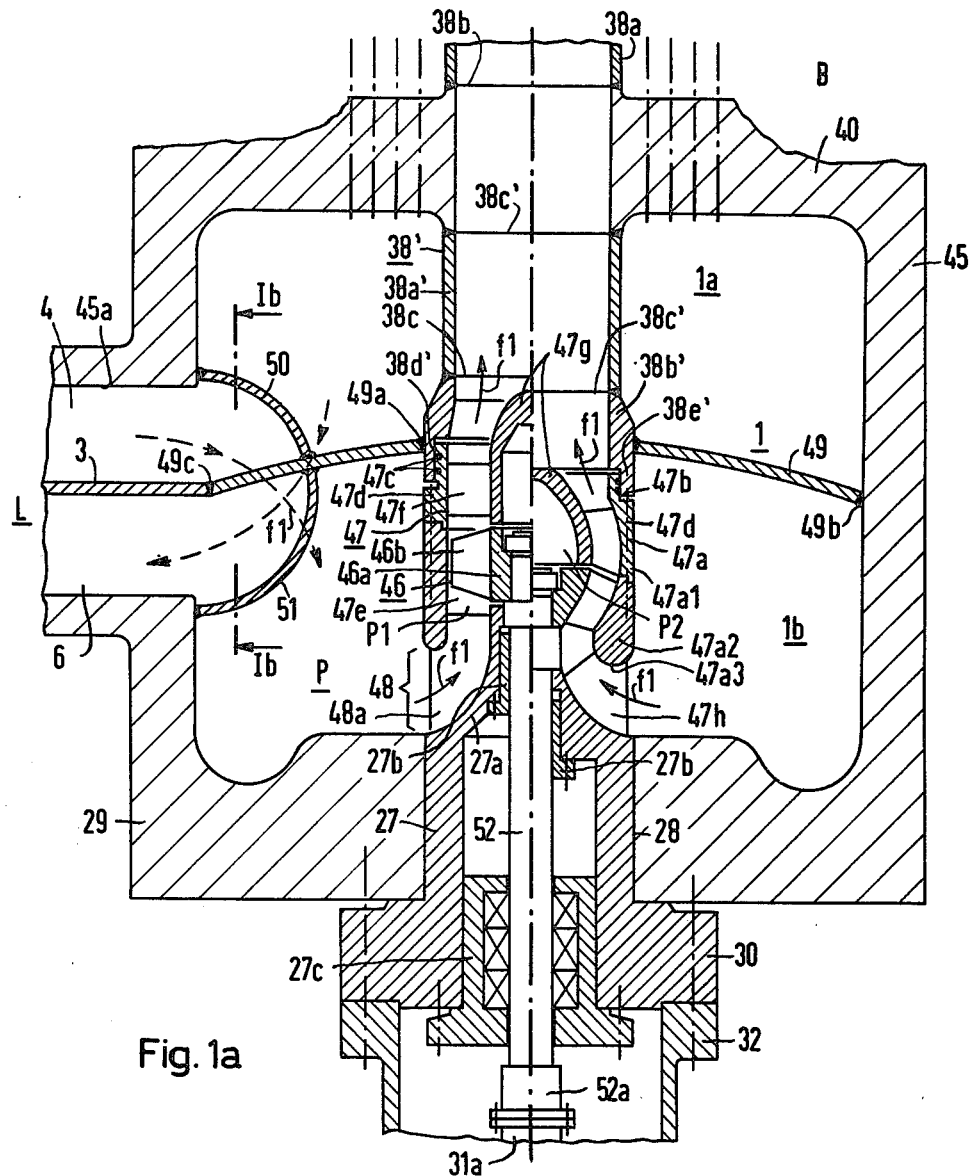
FIG. 1a is an enlarged fragmentary view of FIG. 1, showing the lower primary chamber.
Figure 2:
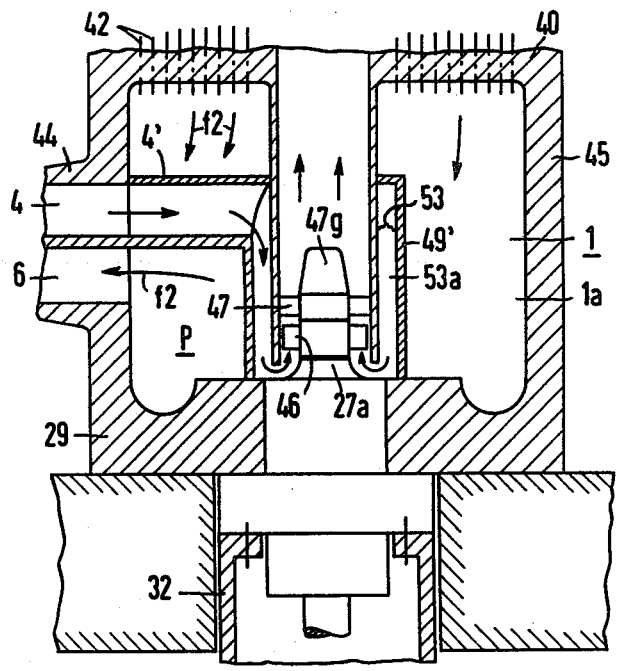
FIG. 2 is a view similar to that shown in FIG. 1a, of a second embodiment of the invention, wherein the pump is disposed in the hot line string, with a particularly short pump shaft butt end.
Figure 3:
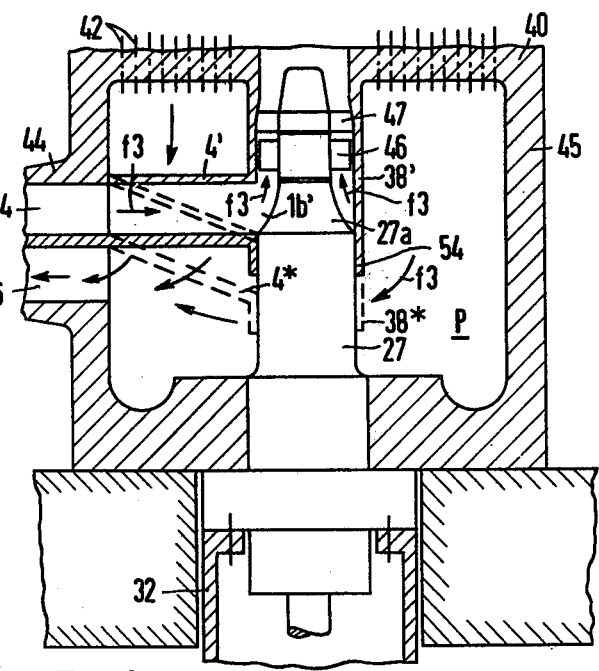
Figure 4:
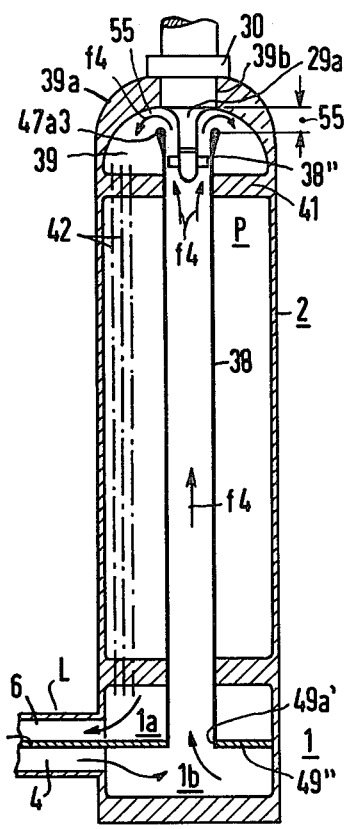

FIG. 3 is another view similar to those shown in FIGS. 1a and 2, of a third embodiment of the invention, wherein the guide-member for flow to the pump is particularly simply formed; and FIG. 4 is another view like that shown in FIG. 3, of a fourth embodiment of the invention, showing a very simplified schematic presentation of the structural unit, wherein the lower primary chamber is particularly simple due to the installation of the pump in the upper primary chamber of the steam generator, and the upper primary chamber has practically perfect rotationally-symmetrical flow conditions.

Referring now to the drawing and first, particularly, to FIG. 1 thereof, there is shown a nuclear reactor plant secured against rupture which includes a pressurized water reactor R, a steam generator D, a main coolant pump P, hereinafter referred to as pump, in the interest of simplification, and a double line L or pipe L connecting the pressurized water reactor R to the pump P and the steam generator D flow-wise into a circulatory loop. The main coolant pump P, by being built into the lower primary chamber 1 of the steam generator P is united with the latter into a structural unit. The double line L is constructed as a two-chamber pipe with a substantially horizontally extending partition 3, by means of which a string or length of hot line 4, which conducts the coolant out of the core 5 of the reactor R, is pressure-tightly separated from a thereunderlying string or length of cold line 6, which conducts cooled coolant blowing out of the steam generator D to the reactor R (note the flow-representing arrows f1). In the interest of simplification, only one circulatory loop is shown in FIG. 1, since it is adequate for understanding the invention. In actuality, a multiplicity of the structural units 2 are distributed around the periphery of the reactor R and disposed in a multiple circulatory loop arrangement or circuit connection. A preferred embodiment is a four-loop circulatory arrangement for about 1300 MWe power plant output or capacity. As is apparant, the structural unit 2 is erect or upright and is disposed at such a level with respect to the reactor R that a short, straight and largely horizontal double line L is employable for connecting them to one another. The line L with the structural unit 2 thus lies virtually on a radius extending outwardly from the central axis r of the reactor R, which produces salutary bearing or supporting and thermal expansion relationships.

In particular, the containment shell S which surrounds the nuclear reactor plant, is of prestressed concrete construction with a tight steel jacket S1 and is provided with prestressed concrete foundations 7 and 8, respectively, for the reactor R and for the structural unit 2. A shell 9 protective against rupture of the reactor 9 is formed of a casing 9a with superimposed support ring 9a1, a base 9b and a cover 9c, the members 9a, 9a1 and 9b being produced by prestressed concrete technology and axially braced one to another by non-illustrated axial tension or tie rods into an upwardly open prestressed concrete vessel. The double line L extends through a radial through-bore 10 formed in the casing 9a. The reactor R has a substantially cylindrical pressure vessel 11 with a supporting frame 12 and a pressure-tightly braced cover 13. The supporting frame 12 peripherally surrounds the reactor R, and the latter is mounted thereby through spring rods or pins 12a on a bearing or support member 14 which, in turn, adjustable in height by means of intermediate plates 15, rests upon the base 9b of the prestressed concrete vessel 9a, 9b which, in turn, is supported upon the foundation 7. The prestressed concrete vessel 9a, 9b serves simultaneously as a biological shield. The cover 9c for protecting against rupture of the reactor R, is formed of a multilayered intercepting or capture cover 9c1 against the calotte or dome-shaped part of the pressure-vessel cover 13. In the installed operationally warm condition, the axial bracing force of the shell 9 which protects against reactor rupture is transmitted through suspension supports 16 to the reactor R (a multiplicity of suspension supports 16 being uniformly distributed over the periphery of the reactor R. The suspension supports 16 engage, on the one hand, an inwardly sloping inclined surface formed on the support ring 9a1 and, on the other hand, the capture ring 9c2, and are pivotable by non-illustrated pivot bearings and hydraulic power pistons into and out of the bracing position shown in FIG. 1. In radial direction, the force lock from the reactor R to the casing 9a protective against reactor rupture is produced by a pressure-tight insulating layer 17 and a likewise pressure-tight cooling layer 18 and, at the base of the reactor R, the force lock is effected therefrom to the base 9b of the prestressed concrete vessel 9a, 9b correspondingly through an insulating layer 17' and a cooling layer 18'. The non-illustrated nuclear core is received in a core container 19, and the flowpath of the coolant in the reactor R is also represented by arrows f1. The sheathing generally identified as 21 for protecting against rupture of the structural unit 2 is formed of a protective casing 21a, a protective base 21b and a protective cover 21c. The casing 21a is constructed as a multilayer cylinder and welded at 22 to the base 21b. The cover 21c is inwardly curved i.e. concave, and (to facilitate assembly) is bipartite, although not actually so illustrated, and is supported through a support ring 21c1 at an opposing ring 21a1 of the casing 21a. An annular space formed between the structural unit 2 and the casing 21a and defined at the bottom and the top thereof, respectively, by the base 21b and the cover 21c is filled with a pressure-tight insulating layer 23 which, just like the insulating layer 17 and 17', is advantageously formed of pressure-tight insulating concrete blocks which are removable from the annular space from the outside for the purpose of inspecting the structural unit 2. The structural unit 2 is thermally displaceably mounted, by the base 21b thereof, and through a bearing member 24 applied to the underside of the base 21b and formed with an inclined bearing surface, on a support member 25 having a correspondingly inclined opposing surface, the support member 25 being secured to a support bracket 26 resting on the foundation 8. A bearing 240 formed of elastomeric material is inserted between the bearing and support members 24 and 25 and permits radial and axial thermal displacement of the structural unit 2. The pump P is inserted with a tight fit by a housing shaft or shank 27 thereof into a through-insertion bore 28 formed in the chamber base 29 and is tightly braced, with a housing flange 30 thereof, against the chamber base 29. The connection of the pump housing shaft 27 to the pump motor 31 is effected through a spacer member or cage 32. The pump P and the motor 31 are thus fastened in suspended disposition at the chamber base 29. A shock absorber 33 is introduced between the casing 9a surrounding the reactor R and the base 21b of the sheathing for the structural unit 2. Also provided are an assembly carriage 34 and damping elements 35 engaging at opposite sides of the upper end of the structural unit 2, as viewed in FIG. 1, as a support or bracing protective against earthquakes.

The double line L is also provided with a casing 36 for protecting against rupture thereof, the casing 36 being formed of axially strung-together steel ring, and provided as well with an insulating casing 37.

In accordance with the invention, a straight-pipe steam generator with a central riser or ascending pipe 38 is employed as the steam generator D of the structural unit 2, the ascending pipe 38 passing through a bundle 42 of the straight pipes in a central pipe passageway or alley 43, the ends of the tube bundle 42 being held, respectively, in tube support plates 40 and 41, and the tube bundle 42 extending between an upper primary-side inlet chamber 39 and the lower hereinaforementioned primary-side outlet chamber 1. The straight-pipe bundle 42 is indicated in FIG. 1 solely by dot-dash lines. The riser or ascending pipe 38 feeds primary medium into the inlet chamber 39 (note the flow-representing arrows f1), from where the primary medium flows back through the tube bundle 42 to the lower primary chamber 1 and, in fact, to the upper outlet chamber space 1a thereof. The double line L is connected through a lead-through union or connecting piece 44 to the lower primary chamber 1.

Figure 1B:
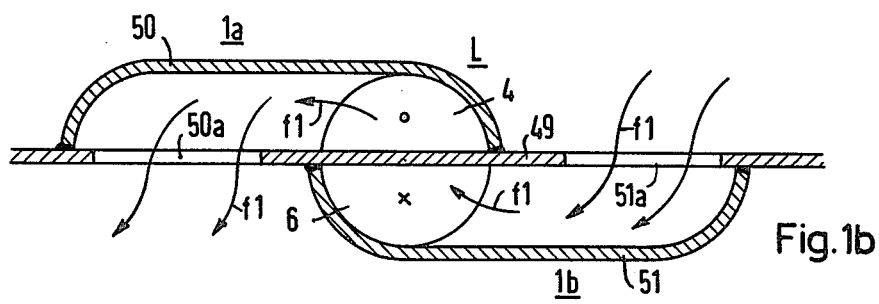
FIG. 1b is a cross-sectional view taken along the line Ib—Ib in FIG. 1a, in the direction of the arrows.

Reference is now made to the detailed representation in FIGS. 1a and 1b for a more specific explanation of the lower primary chamber 1. The primary chamber 1 encompasses a housing which has a greater wall thickness than that of the steel pressure vessel of the steam generator D. Besides the hereinaforementioned pipe base or tube support plate 40 and the base 29, as cover and base limiting or defining members, the primary chamber 1 has a cylindrical wall 45 formed with an aperture 45a for connecting or joining thereto the double line L including the partition 3 thereof. In the upper part of FIG. 1a, the lower end 38a of the ascending pipe 38 is visible which is welded (annular welding seam 38b) to the upper side of the tube support plate 40. At the underside of the tube support plate 40, an axial elongation 38' of the ascending pipe is provided, which is constructed as a flow guidance device surrounding the impeller 46 with hub or boss 46a and blade ring 46b of the pump P. By the axial elongation 38', there is meant a flow-wise axial elongation without having to have a direct metallurgical connection to the ascending pipe 38, the latter being, of course, not excluded. From the standpoint of manufacturing technology, what is more advantageous, moreover, is the described embodiment wherein a pipe section 38' is welded by the upper end thereof to the underside of the tube support plate 40 and, by the lower end thereof, to a reinforced or beefed-up, similarly hollow cylindrical middle section 38b' (note annular welding seam 38c'). In the left-hand half of FIG. 1a, an axial feed pump P1 is shown and, in the right-hand side of that figure, a semi-axial feed pump P2, in order to make it clear that both axial as well as semi-axial pumps are suited for the invention. Since the basic construction of both types of pumps is the same, like reference characters have been employed in both cases, and reference will be made hereinafter only generally to pumps P. The guidance device 47 of the pump P belonging to the elongation 38' has an outer hollow-cylindrical bipartite flow guidance member 47a with an upper constricted throat section 47b which is fitted, through the intermediary of sealing rings 47c, into a downwardly directed take-up bore 38d' of the middle section 38b'. Through axial fastening screws 47d, shown diagrammatically by dot-dash lines, both axially aligned cylindrical parts 47a1 and 47a2 of the flow guidance member 47a are joined together and to an annular collar 38e' of the middle section 38b'.

The guidance device 47 forms with the flow guidance member 47a thereof, as hereinaforementioned, an axial elongation of the ascending pipe 38. The flow guidance member 47a is disposed with the lower end thereof spaced a distance 48 from the base 29 of the primary chamber 1. In this manner, a suction-annular space 48a of the pump P is formed between the lower edge 47a3 of the flow member 47a and the upwardly, inwardly curved or concave tapering housing shaft section 27a, coolant flow in the suction-annular space 48a being diverted substantially from radial-tangential direction in axial direction in the annular channel 47a of the guidance device 47. The guide vane ring 47f disposed above the impeller blade ring 47b is held between the hub or boss 47g and the flow guidance member 47a1. This hub 47g has the conventional flow-conducive outer contour for effecting a transition of the flow out of the annular channel 47e into the ascending pipe 38. As is apparent, the pump P is inserted through the hereinaforementioned through-insertion bore 28 formed in the chamber base 29 into the ascending-pipe elongation 47a. A substantially horizontal partition 49 is centrally penetrated by the axial elongation 38' of the ascending pipe 38, in this case by the middle section 38b' thereof, and is tightly welded (annular welding seam 49a) to this middle section 38b' as well as also to the inner periphery of the primary chamber 1 along a sealing seam 49b and to the partition 3 of the double line L along a sealing seam 49c. The partition 49, as shown, is constructed with a slight upward curvature or concavity which affords advantages of strength and stability; the partition 49 is nevertheless described herein as extending substantially horizontally. The primary chamber space 1a located above the partition 49, as viewed in FIG. 1a, serves as suction chamber of the pump P and communicates with the hot line string 4 of the double line L, whereas the cold line string of the double line L is connected to the upper outlet chamber space 1a and, in fact, through a hereinbelow = explained diverting system. In this regard, the hot line string 4 is sealed by a first domed or arched diverting plate member 50 (note also FIG. 1b) from the outlet chamber space 1a located above the partition 49 and terminates in the suction space 1b after passing through a first partition opening 50a covered by the first diverting plate member 50 and offset laterally from the course of the double line L. The cold line string 6, on the other hand, is sealed by a second domed or arched diverting plate member 51 from the suction space 1b located below the partition 49 and communicates with the outlet chamber space 1a through a second partition opening 51a covered by the second diverting plate member 51 also offset laterally from the course of the double line L. The second partition opening 51a is disposed opposite to and laterally offset from the first partition opening 50a. The flow diagrammatically indicated by the flow lines f1, wherein the pump P, as shown, is disposed in the so-called hot line string, is produced therewith. By the "hot line string" there is meant the line system extending from the outlet of the reactor to the inlet of the steam generator. It was found that the virtually axially symmetrical disposition of the flow guidance device 47 realized thereby as an elongation 38' of the ascending pipe 38 provides especially desirable on-flowing and outflowing relationships for the pump P and that, thereby the somewhat higher, coolant temperature for the pump P can be taken into account especially since the temperature drop in the primary circulatory loop of the steam generator D from the hot to the cold line string lies only in the order of magnitude of 30° to 35° C. Thus, the hereindisclosed structural unit 2 is constructed or designed for an inlet temperature at the steam generator of $t_E = 327°$ C. $= 600°$ K. and for an outlet temperature $t_A + 295°$ C. $= 568°$ K. for an operating pressure of 158 bar. In the interest of completeness, it should be mentioned that the pump shaft 52 is mounted within a housing part 27 in a radial bearing 27b and extends through a seal housing 27c, a shaft coupling 52a being disposed between the pump shaft 52 and the motor shaft 31a. Between the lower part 47a2 of the flow guidance member 47a and a housing shaft part 27a, an advance guidance-vane ring 47h can yet be disposed which can simultaneously serve as bracing of the flow guidance member 47a at the housing shaft part 27a.

The embodiment according to FIG. 2 differs from that according to FIGS. 1 and 1a in that, instead of the substantially horizontally extending partition 49 and the diverting plate members 50 and 51, of FIGS. 1 and 1a, the axial elongation 38' of the ascending pipe 38 is surrounded with radial spacing 53 by a substantially cylindrical partition 49' so that a suction-annular space 53a closed off from the outlet chamber space 1a is formed, the hot line string 4 of the double line L being directly connected to the upper region of the suction-annular space 53a through an elongation member forming a feed pipe 4'. The course of flow is represented in FIG. 2 by the arrows f2. An especially short housing shaft part 27a with a correspondingly short non-illustrated pump shaft results therefrom.

In the embodiment according to FIG. 3, the lower end of the axial ascending pipe-elongation 38' forms, with the cylindrical pump housing shaft part 27 of corresponding outer diameter, a tight or sealing seat 54. A pump-shaft tapered section 27a disposed between the tight seat 54 and the impeller and guidance device 46 and 47 of the pump P defines, with the casing of the axial elongation 38', a suction space 1b' to which, in turn, an elongation member 4' for the hot line string 4 is connected. The enlarged axial length of the pump housing shaft part 27 and, accordingly, the non-illustrated pump shaft, can thereby be shortened, with this embodiment of the invention, so that the elongation member 4' does extend perpendicularly but rather extends at an inclination downwardly from the hot line string to the then corresponding, downwardly drawn axial elongation 38', as indicated by the respective broken-line positions 4* and 38* thereof. The flow directions are represented by arrows f3 in FIG. 3.

In the fourth embodiment according to FIG. 4, an axial elongation 38" of the ascending pipe 38, at the upper end thereof, with a clearance space 55 therefrom to the cover 39a of the primary-side inlet chamber 39 is provided. The pump P is inserted from above through a pass-through opening 39b formed in the chamber cover 39a into the ascending pipe elongation 38". As the flow arrows f4 indicate, a pump pressure chamber is defined by the inlet chamber 39, and a pump suction chamber by the ascending pipe 38 connected to the pump P upstream thereof. Also, a diverting annular channel 55a for diverting the primary coolant flow out of the ascending pipe elongation 38" in direction toward the tube support plate 41 is defined by the pump housing shaft 29a, which has upwardly flaring, curved boundary surfaces, and correspondingly rounded-off ascending pipe-upper edges 47a3. For the lower primary chamber 1, in this embodiment of the invention, an especially simple disposition of the installations therein is provided. The lower end of the ascending pipe 38 is held in a pass-through bore 49a' formed in a substantially horizontal partition 49", the primary chamber 1, as for the embodiment of FIGS. 1 and 1a, being divided by the partition 49" into an upper outlet chamber space 1a and into a lower suction space 1b terminating in the ascending pipe 38. The hot line string 4, however, in the embodiment of FIG. 4, lies in the lower half of the double line L which, in turn, is constructed as a two-chamber pipe with a horizontal partition 3, and the cold line string 6 is located in the upper half of the double line L. Consequently, without using special diverting wall members, the primary coolant can be conducted out of the hot line string directly into the suction space 1b and out of the outlet chamber space 1a directly into the cold line string 6.

There is claimed:

1. In combination, a coolant pump and a steam generator formed together into a structural unit, the steam generator being a straight-tube steam generator having a central ascending pipe, a tube bundle having a central passageway through which said ascending pipe extends, an upper primary-side inlet chamber communicating with said tube bundle at an upper end thereof, a lower primary chamber communicating with said tube bundle at a lower end thereof, said central ascending pipe communicating with said inlet chamber for feeding primary medium thereto from which the primary medium flows back through said tube bundle to said lower primary chamber, said ascending pipe having an axial elongation, the coolant pump having an impeller and a guidance device surrounding said impeller, said ascending pipe-elongation having a construction corresponding to that of said guidance device, partition means for dividing said lower primary chamber into a suction space and an outlet chamber space, said pump having a suction side connected through said suction space of said lower primary chamber to a hot line string of a double line connected to the steam generator, said outlet chamber space of said lower primary chamber being connected to a cold line string of said double line.

2. Structural unit according to claim 1 wherein said lower primary chamber has a base, and said axial elongation of said ascending pipe has a lower end disposed with a clearance space from said base of said lower primary chamber, said pump extending from below through a pass-through opening formed in said base of said lower primary chamber and into said ascending-pipe elongation.

3. Structural unit according to claim 2 wherein said double line is constructed as a two-chamber pipe having a substantially horizontal partition therein subdividing it into a hot and cold line string.

4. Structural unit according to claim 3 wherein said axial elongation of said ascending pipe passes substantially centrally through said partition of said lower primary chamber, and including means for connecting said ascending pipe-extension and said partition of said double line to an inner periphery of said lower primary chamber.

5. Structural unit according to claim 4 wherein said hot line string extends through the upper half of said double line, and said cold line string extends through the lower half thereof, and including a first arcuate diverting plate member closing off said hot line string from the outlet chamber space located above said partition of said lower primary chamber, said hot line string communicating with said suction space through a first opening formed in said partition of said lower primary chamber and laterally offset from the path of flow in said double line, said first opening being covered by said first diverting plate member, a second arcuate diverting plate member closing off said cold line string from the suction space located below said partition of said lower primary chamber, said cold line string communicating with said outlet chamber space through a second opening formed in said partition of said lower primary chamber and laterally offset from the path of flow in said double line, said second opening being covered by said second diverting plate member and being located opposite said first opening.

6. Structural unit according to claim 1 wherein said lower primary chamber has a base, and said axial elongation of said ascending pipe has a lower end disposed with a clearance space from said base of said lower primary chamber, said pump extending from below through a pass-through opening formed in said base of said lower primary chamber and into said ascending-pipe elongation, said double line being constructed as a two-chamber pipe having a substantially horizontal partition therein subdividing it into a hot and a cold line string, wherein said partition means of said lower primary chamber comprise a substantially cylindrical wall, said axial elongation of said ascending pipe being surrounded with radial clearance by said substantially cylindrical wall and defining therewith said suction space in an annular shape closed from said outlet chamber space, an elongation member in the form of a feed pipe connecting said hot line string of said double line to an upper region of said annular suction space.

7. Structural unit according to claim 1 wherein said lower primary chamber has a base, and said axial elongation of said ascending pipe has a lower end disposed with a clearance space from said base of said lower primary chamber, said pump extending from below through a pass-through opening formed in said base of said lower primary chamber and into said ascending-pipe elongation, said double line being constructed as a two-chamber pipe having a substantially horizontal partition therein subdividing it into a hot and a cold line string, wherein said pump has a pump housing shaft formed with a cylindrical and a tapered shaft section, and wherein said lower end of said axial ascending-pipe elongation has an inner diameter corresponding to the outer diameter of said cylindrical shaft section and forms a tight seat thereon, said tapered shaft section being located between said tight seat, on the one hand, and said impeller and said guidance device, on the other hand, and with the inner surface of said axial ascending-pipe elongation, defining said suction space, and including an elongation member in the form of a feed pipe connecting said hot line string of said double line to said suction space.

8. Structural unit according to claim 1 wherein said upper primary-side inlet chamber has a cover, said axial elongation of said ascending pipe being located at the upper end thereof and being disposed with a clearance space from said cover, said pump extending from above through a pass-through opening formed in said cover and into said ascending-pipe elongation, said upper primary-side inlet chamber constituting a pump pressure chamber, and said ascending tube upstream of said pump constituting a pump suction chamber.

9. Structural unit according to claim 8 wherein said pump housing shaft has upwardly flaring curved boundary surfaces and said ascending pipe has correspondingly rounded-off upper edges, said boundary surfaces and said rounded-off upper edges defining therebetween a diverting annular channel for diverting a primary medium flow flowing upwardly through said ascending pipe into a downward direction toward an upper tube support plate at the bottom of said upper primary-side inlet chamber.

10. Structural unit according to claim 8 wherein said partition means of said lower primary chamber comprise a substantially horizontal partition, the lower end of said ascending pipe being retained in a pass-through bore formed in said substantially horizontal partition, said outlet chamber space being located above and said suction space being located below said partition in said lower primary chamber, said ascending tube communicating with said suction space, said hot line string extending along a lower half of said double line and into said suction space, and said cold line string extending along an upper half of said double line and being connected to said outlet chamber space.

11. Structural unit according to claim 1 wherein said coolant pump is an axial-flow pump.

12. Structural unit according to claim 1 wherein said coolant pump is a semi-axial flow pump.

13. Structural unit according to claim 1 in assembly in a nuclear reactor installation having a pressurized water reactor and connecting lines connecting said presurized water reactor, said coolant pump and said steam generator into a primary circulatory loop, said coolant pump being installed in a primary chamber of said steam generator, said string of hot and cold lines being provided in said primary circulatory loop between a pressure vessel enclosing said reactor and the primary side of said steam generator.

* * * * *